Figure 1:
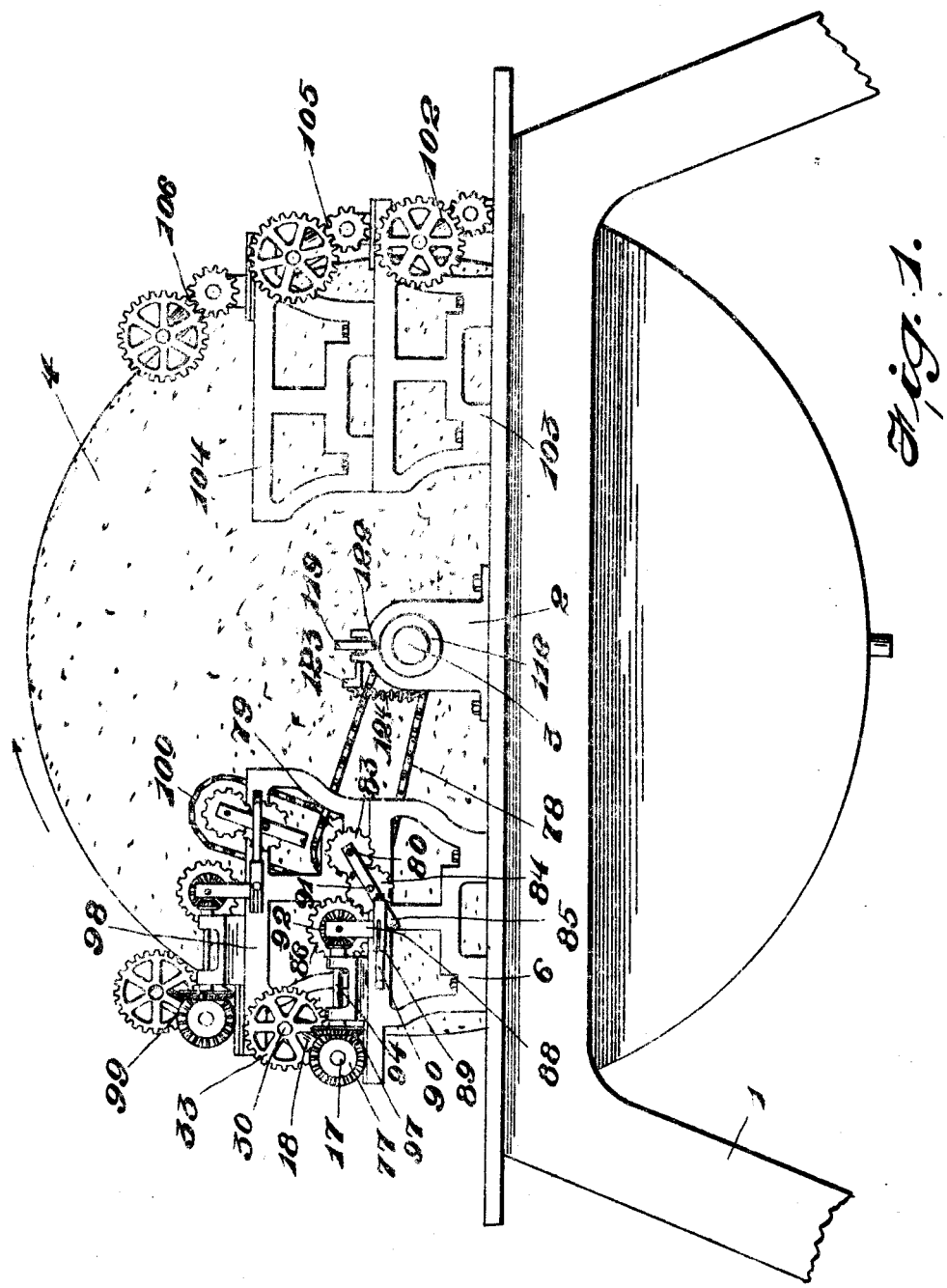

J. H. COSSMAN.
MACHINE FOR GRINDING THE EDGES OF LENSES AND THE LIKE.
APPLICATION FILED AUG. 17, 1912.

1,171,027.

Patented Feb. 8, 1916.
7 SHEETS—SHEET 2.

WITNESSES:

INVENTOR:
Joseph H. Cossman,
BY
Russell W. Everett,
ATTORNEY.

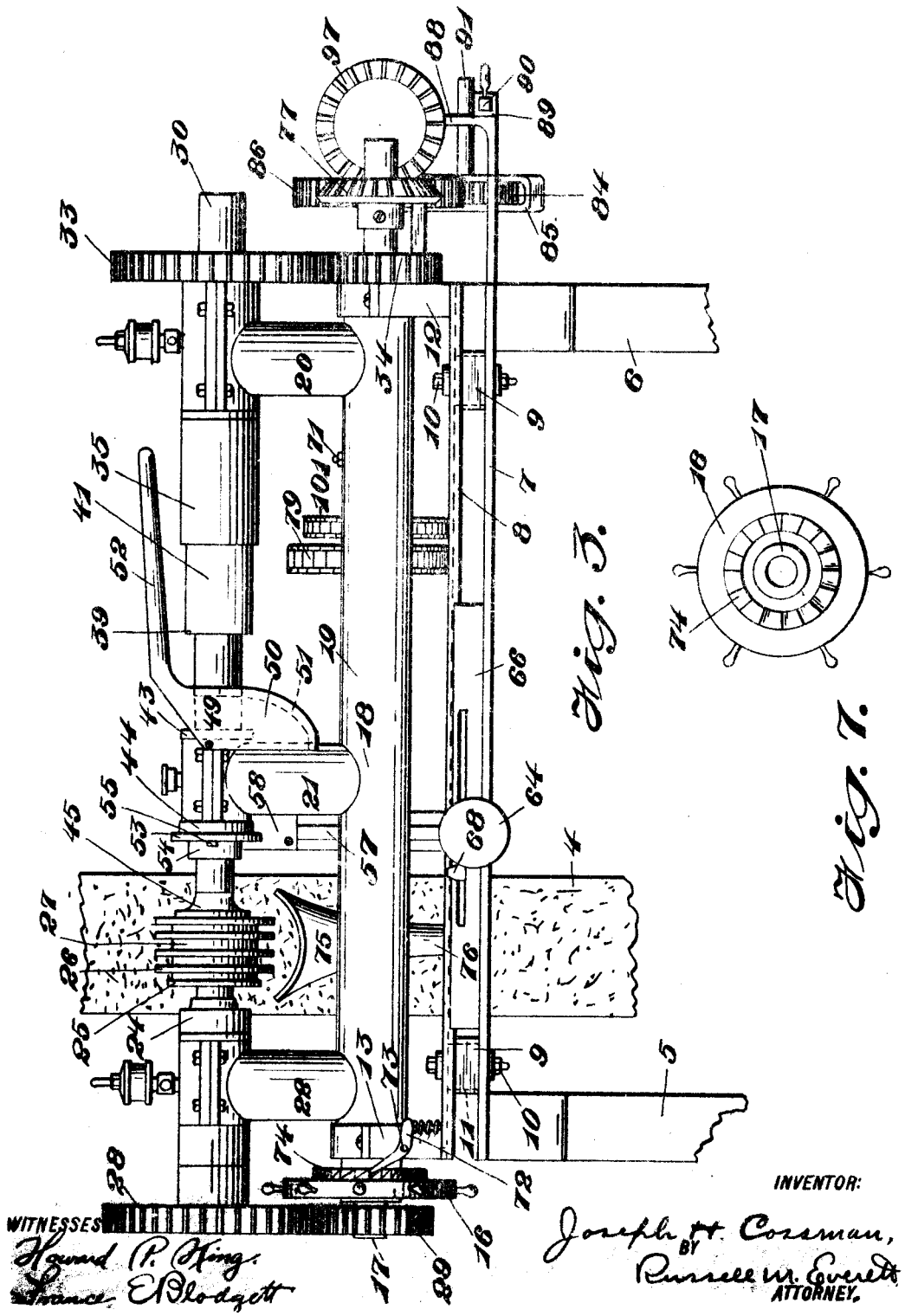

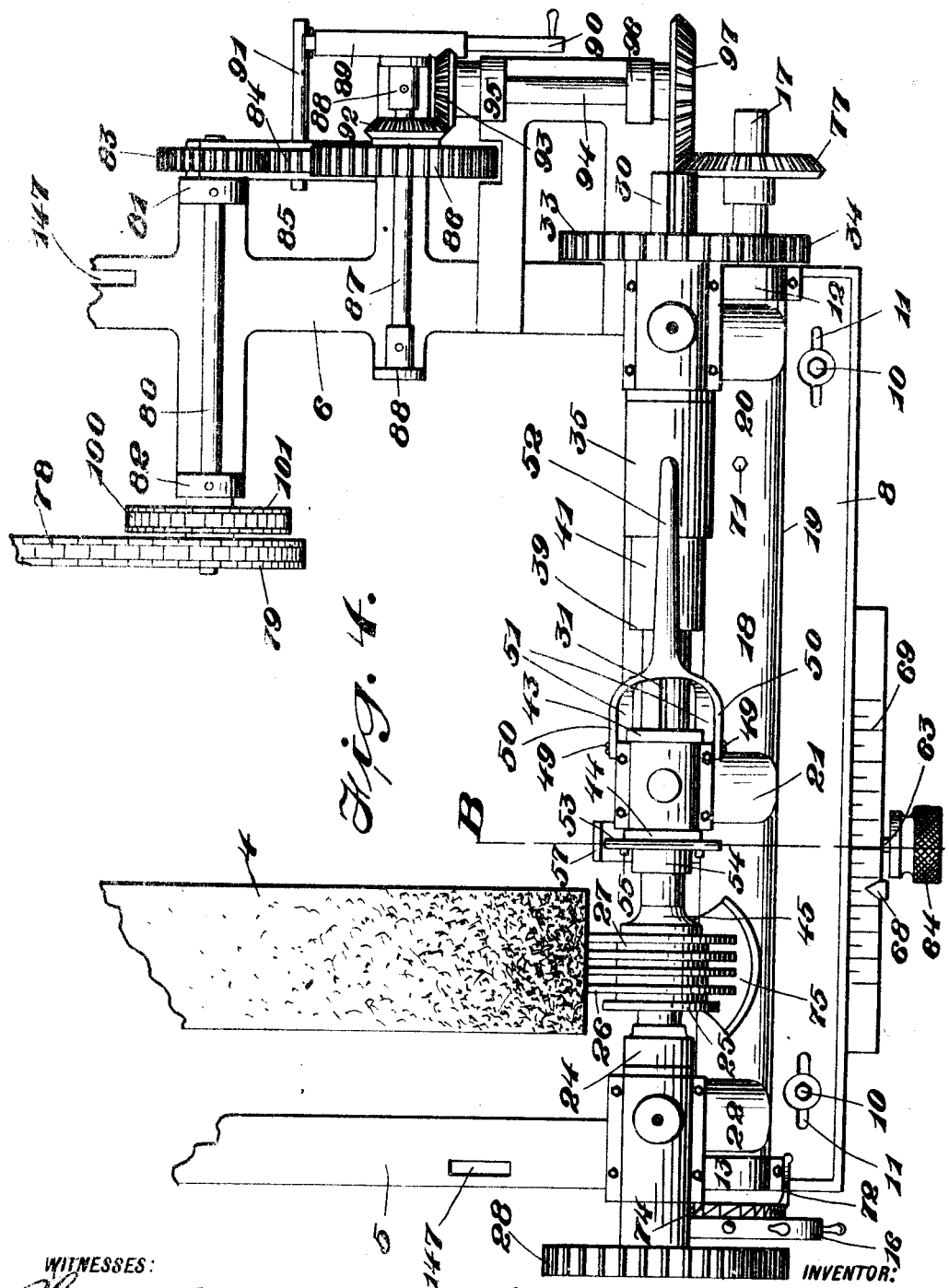

J. H. COSSMAN.
MACHINE FOR GRINDING THE EDGES OF LENSES AND THE LIKE.
APPLICATION FILED AUG. 17, 1912.
1,171,027.
Patented Feb. 8, 1916.
7 SHEETS—SHEET 5.
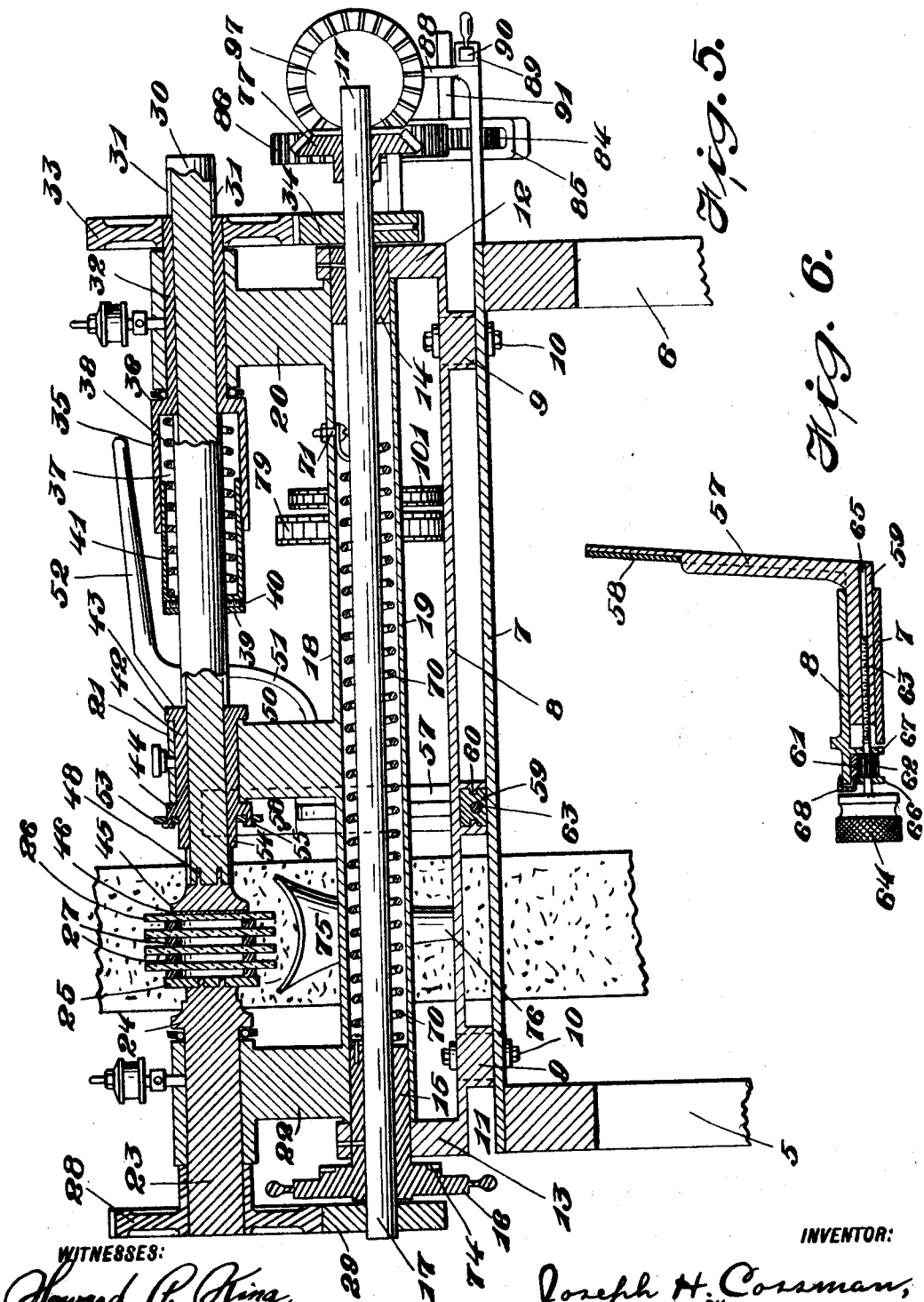

J. H. COSSMAN.
MACHINE FOR GRINDING THE EDGES OF LENSES AND THE LIKE.
APPLICATION FILED AUG. 17, 1912.
1,171,027.
Patented Feb. 8, 1916.
7 SHEETS—SHEET 6.
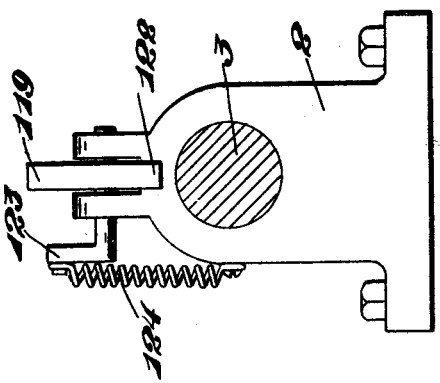
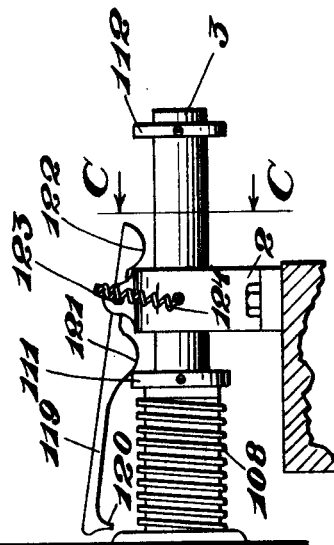
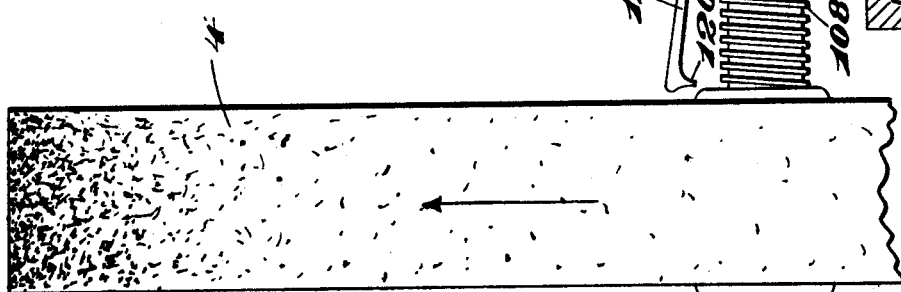
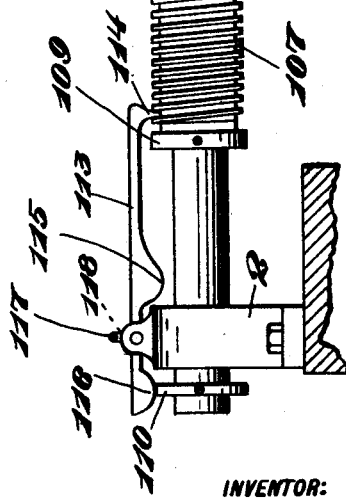
WITNESSES
INVENTOR:
Joseph H. Cossman,
BY
Russell M. Everett,
ATTORNEY.

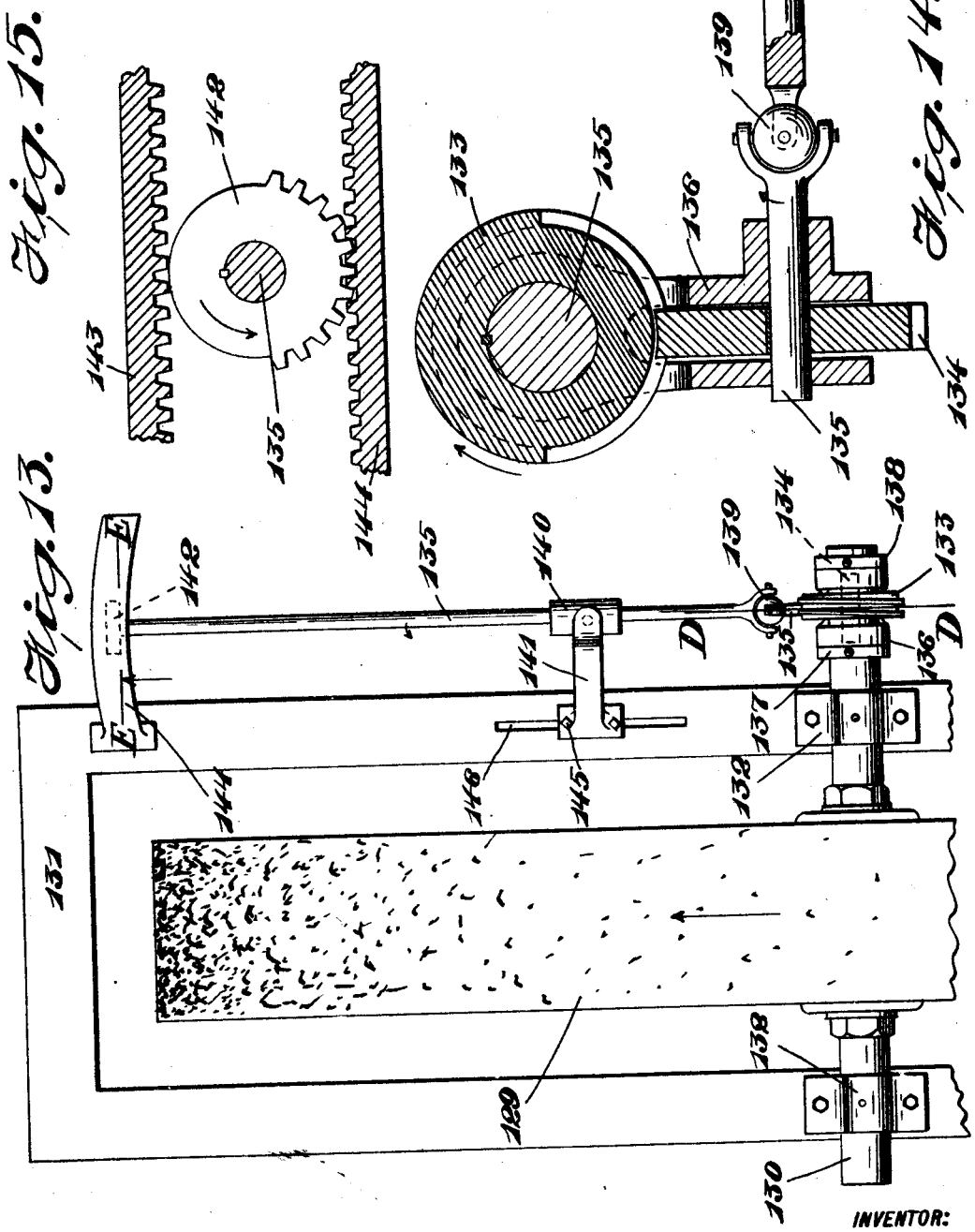
J. H. COSSMAN.
MACHINE FOR GRINDING THE EDGES OF LENSES AND THE LIKE.
APPLICATION FILED AUG. 17, 1912.
1,171,027. Patented Feb. 8, 1916.
7 SHEETS—SHEET 7.

UNITED STATES PATENT OFFICE.

JOSEPH H. COSSMAN, OF IRVINGTON, NEW JERSEY, ASSIGNOR, BY MESNE ASSIGNMENTS, TO COSSMAN MANUFACTURING COMPANY, A CORPORATION OF NEW JERSEY.

MACHINE FOR GRINDING THE EDGES OF LENSES AND THE LIKE.

1,171,027. Specification of Letters Patent. Patented Feb. 8, 1916.

Application filed August 17, 1912. Serial No. 715,552.

*To all whom it may concern:*

Be it known that I, JOSEPH H. COSSMAN, a citizen of the United States, residing at Irvington, in the county of Essex and State of New Jersey, have invented certain Improvements in Machines for Grinding the Edges of Lenses and the like, of which the following is a specification.

The objects of this invention are to enable a plurality of lens holding-means to be employed with a single grinding stone, each of which means can be operated independent of the others to grind lenses; to provide a series of such means at each end of the grinding-stone frame, at opposite peripheral points of the stone; to provide means for actuating each lens-holding means of such a series from the next preceding one; to secure compactness of construction, whereby a greater number of units can be employed in connection with a grinding stone and all tended by a single operator; to enable the lenses to be readily and quickly inserted and yet with great accuracy, so that they will be ground true and exact; to enable different numbers of lenses to be properly supported in the same carrier; to provide a tension for holding the lenses against the stone which can be readily adjusted or wholly released so that the carrier may tilt idly away from the stone for the purpose of removing or inserting lenses or the like; to provide lens-holding means which can be adjusted with respect to the grinding stone and thus used with different stones; to secure improved means for regulating the sizes to which lenses may be ground, and indicating means therefor arranged horizontally in a conspicuous position where the operator can look down upon it; to secure rigidity of construction and simplicity of operation, and to obtain other advantages and results as may be brought out in the following description.

Figure 2:
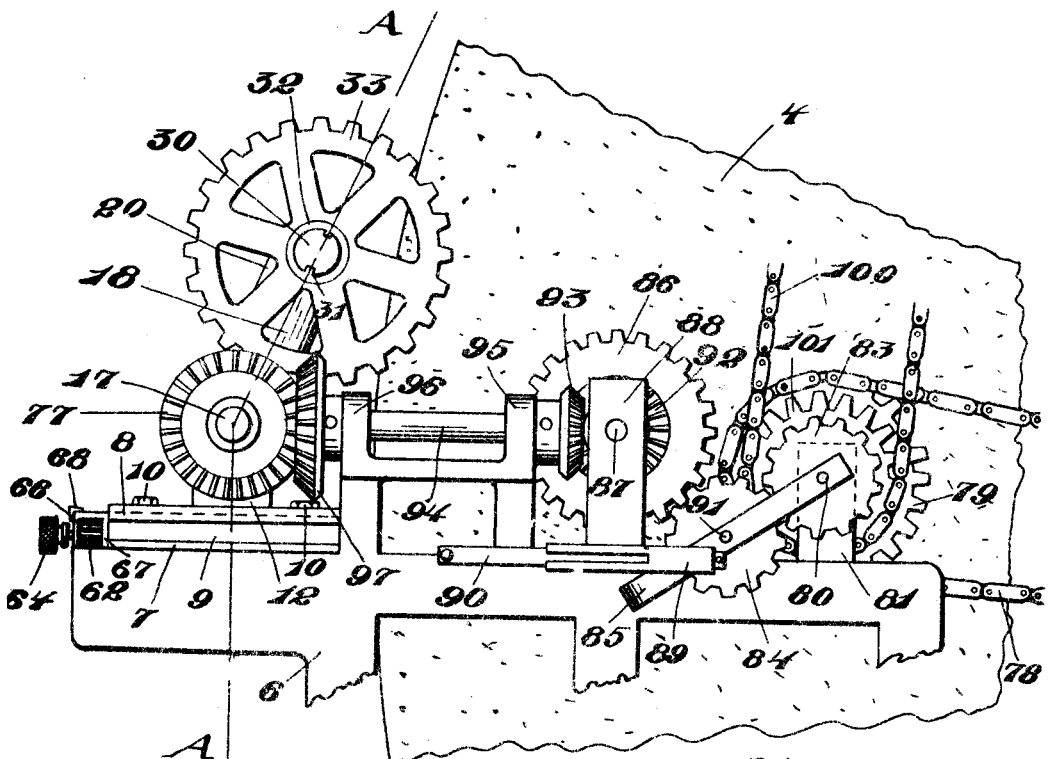
Figure 8:
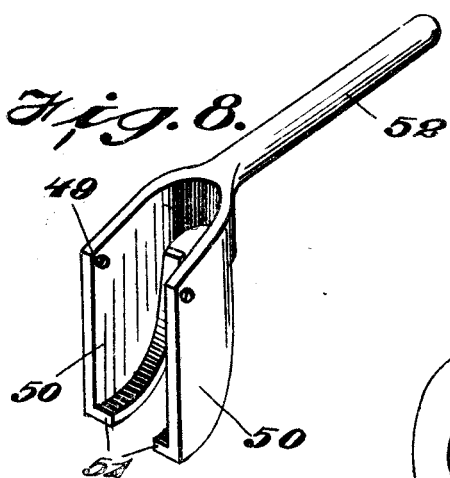
Figure 10:
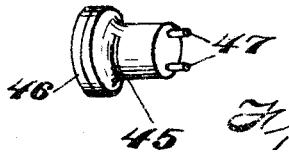
Figure 9:
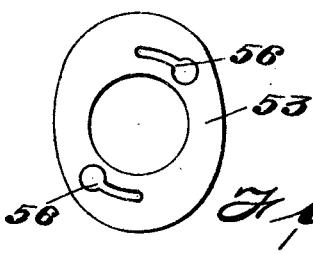

Referring to the accompanying drawings, in which like numerals of reference indicate the same parts throughout the several views, Figure 1 is a side elevation of a machine for grinding the edges of lenses embodying my invention; Fig. 2 is a similar view of a portion of the machine showing certain details on a larger scale; Fig. 3 is a view looking toward the edge of the grinding stone and showing one of the lens-supporting means which is viewed endwise in Fig. 2; Fig. 4 is a plan showing said lens-supporting means; Fig. 5 is a sectional view taken on line A—A of Fig. 2; Fig. 6 is a sectional view of a certain gage for determining the size to which the lenses are ground, taken on line B of Fig. 4; Fig. 7 is an end view of a certain tension-adjusting sleeve; Fig. 8 shows in perspective a lever for releasing the lens-carrier members from the lenses; Fig. 9 shows a pattern which may be used in my improved machine to determine the shape of the lenses; Fig. 10 is a perspective view of a removable head which may be used in different sizes to engage the lenses to be ground; Fig. 11 illustrates means for shifting the grinding stone longitudinally of its axis to secure uniform wear on its peripheral surface; Fig. 12 is a sectional view on line C—C of Fig. 11, looking in the direction indicated by the arrow, with the grinding stone omitted; Fig. 13 is a plan view of modified means for shifting the grinding stone; Fig. 14 is a section of the same taken on line D—D Fig. 13, and Fig. 15 is another sectional view taken on line E—E of Fig. 13, looking in the direction indicated by the arrow.

In said drawings, 1 indicates a frame having bearings 2, 2 in which is journaled the shaft 3 of a grinding stone 4, all of which parts may be of any ordinary and well-known construction. It will be understood that such stones are already in use, and upon the upper part of one end of the frame 1 is commonly supported means for grinding upon the stone the edges of lenses, which old means I have not shown in the drawings although a space is provided to receive the same at the left-hand end of the frame in Fig. 1.

In carrying out my invention, I mount upon the frame 1 in such position as to leave proper space for the said grinding device heretofore employed, side pieces or stanchions 5, 6 which are firmly secured to the frame 1 and project upward therefrom on opposite sides of the grinding stone to support the various parts next to be described. Preferably, a plate 7 is secured on top of the side pieces 5, 6, and upon this plate is mounted a second plate 8 shown as having feet 9 holding it up from the plate 7 and bolts 10 extending through said feet to clamp the two plates rigidly together. Said bolts extend through slots in one of the plates, as at 11 in Figs. 3, 4 and 5 of the drawings and thus the second plate can be adjusted longitudinally of itself or transversely of the grinding stone and its frame, so as to position the parts carried by said plate with respect to the stone, as will be hereinafter more fully described. Said second plate 8 has near its ends upwardly projecting bearings 12, 13, one of which, as 12, receives a bushing 14 preferably fast with respect to said bearing, and the other bearing 13 receives a sleeve 15 having outside the bearing a hand-wheel 16 for turning it. Within said bushing 14 and sleeve 15 is mounted a main shaft 17, and upon the outside of said bushing and sleeve, as trunnions, is mounted a rocking or swinging carriage 18. This carriage consists of a tubular portion 19 the ends of which receive said trunnions formed by the bushing 14 and sleeve 15, and from which tubular portion 19 projects lateral alined arms 20, 21 and 22 all of which provide bearings at their upper ends for the rotary lens carrier. Said lens carrier comprises alined end portions or members adapted to clamp the lenses between themselves, one of said members being longitudinally stationary and comprising a rotary spindle 23 mounted in the bearing of the arm 22 with a head 24 at its inner end or end next the other member of the lens carrier, said head carrying a plate 25 against which the lenses 26, each having on opposite sides of itself washers 27, are adapted to be clamped. The outer end of the spindle 23, or end away from the said head 24, receives a gear 28 whose hub prevents longitudinal displacement of the said spindle in the bearing, said gear 28 meshing with a gear 29 on the shaft 17. The other end portion or member of the lens carrier comprises a longitudinally slidable spindle 30 having upon opposite sides of itself longitudinal keyways 31 preferably extending its entire length. Mounted upon said spindle 30 and within the bearing of the arm 20 is a bushing 32 provided with appropriate keys to slidably engage within said key-ways 31, whereby said bushing and spindle must rotate together. Rotary motion is transmitted to the bushing 32 by means of a gear 33 fast upon the outer end of said bushing adjacent the bearing provided in the arm 20, said gear 33 meshing with a gear 34 fast upon the main shaft 17. It is to be understood that these gears 33 and 34 should have the same ratio one to the other as do the corresponding gears 28 and 29 upon the opposite end of the carriage 18, whereby both spindles 23 and 30 are rotated at the same rate. Furthermore, it may here be noted that it has been found practicable under some circumstances to omit entirely the first-described gears 28 and 29 and drive only by means of the opposite gears 33 and 34, wherefore I do not wish to be restricted to use of the pair of drives shown.

Returning to the lens carrier being described, the bushing 32 is provided at the inner side of the arm 20 and its bearing with an enlarged end portion 35 forming a shoulder 36 to prevent movement of the bushing 32 longitudinally outward, said enlarged portion 35 providing an annular space 37 around the spindle 30 to receive a helical spring 38 loose on said spindle. This spring bears at its end away from the bushing 32 against a collar 39 fixed on the spindle 30 as by set screws 40, 40, and thus normally slides said spindle longitudinally toward the other member of the lens carrier so as to clamp the lenses 26 against the head 24 thereof. Preferably, the collar 39 has a cylindrical portion 41 extending over the spring 38 and adapted to telescope with the enlarged portion 35 of the bushing 32.

In a bearing provided by the middle arm 21 is a bushing 42 surrounding the spindle 30 and having appropriate key means to engage within the said keyways 31 of the spindle and turn therewith. The bushing is furthermore provided with collars 43, 44 upon opposite sides of the bearing 21 so as to prevent longitudinal movement of said bushing with respect to said bearing. The inner end of the spindle 30 just beyond the said bushing 42, is provided with a removable head or tip 45, said head preferably providing an enlarged bearing surface to engage the lenses, which is faced with some material such as rubber, as shown at 46 in the drawings. In order to removably secure the said head 45 to the spindle to rotate therewith, a pair of pins 47, 47, shown as part of the head, are adapted to enter appropriate holes 48, 48 in the end of the spindle, and to be removed therefrom when the lens carrier sections are separated by sliding the spindle 30 outward as has been mentioned.

The tendency of the spring 38 already described is to force said spindle 30 and its head 45 toward the longitudinally stationary spindle 23, whereby lenses are clamped therebetween for grinding, as shown. In order to slide said spindle within its bushings 32 and 42 against the action of the spring 38, so as to insert or remove lenses, I provide a lever, shown in Fig. 8 in detail, pivoted as at 49, see Fig. 3, to the middle arm 21 and adapted to engage the collar 39 on the spindle 30 and slide said spindle outward as desired. Said lever comprises a pair of parallel cam plates 50, 50, the cam edges of which are provided with inwardly directed flanges 51, 51 for engagement against the collar 39 already described on the spindle 30 to slide said spindle. A handle 52 joining the said cam plates 50, 50 above the spindle 30 is arranged so as to rotate said cams about the pivotal points 49, 49, said handle preferably lying flatwise along the lens carrier when the same is rotating and projecting upward when the lever is thrown into releasing position.

In order to swing the carriage toward and from the stone to grind the lenses to elliptical shape, I provide a pattern 53 adapted to be removably supported upon an end extension 54 of the bushing 42, by means of headed pins 55, on said bushing engaging in key-hole slots 56 of the pattern. As the spindle 30 is rotated, it necessarily rotates the bushing, whereby the pattern revolves, it being noted that the same is arranged perpendicular to the axis of such rotation. It is to be understood, also, that the plate 25 upon the head 24 is preferably removable and provided with holes to receive pins projecting from the said head, and so positioned thereon that said plate, which is elliptical, can be placed on said pins only with its major axis parallel to the major axis of the pattern 53. By such arrangement the accurate and ready insertion of the lenses in relation to the pattern is facilitated, since they need only be placed in the desired relation to the plate 25 in making up a stack to put into the machine for grinding.

The pattern 53 engages a gage (see Fig. 6) adjustably supported by the bed plate 8, said gage comprising an upwardly extending arm 57, faced near its top with a plate 58 preferably high in its resistance to abrasion, for the pattern to bear against, and having a horizontally disposed base 59 longitudinally slidable upon tracks 60 or the like on the said plate 8 or otherwise suitably supported. This base 59 it will be understood, lies transversely of the swinging carrier, beneath the same, with its arm 57 reaching upward adjacent to the grinding stone, on the opposite side of the carriage from the operator. Transversely of the said base 59, or extending longitudinally of bed plate 8 at its front and beneath the same, is a sliding rack 61 engaged and reciprocated by a pinion 62 fast upon a stem 63 with a knob or handle 64 for turning the same, the inner end of said stem being threaded and entering longitudinally into a correspondingly threaded hole 65 in the base 59 of the gage. By suitably preventing its stem from longitudinal movement, as by inclosing said pinion 61 between walls or flanges 66, 67, an inward or outward movement of the gage is effected by turning handle 64 on screw stem 63. At the same time the turning of said stem moves the rack 61 longitudinally, which movement is indicated by a pointer 68 thereupon which overlies a scale 69 on the upper side of the plate 8. The pitch of the screw threads being proportioned to the diameter of the rack pinion 62, obviously movement of the gage may be indicated upon and measured by the scale 69, so that by looking down at said scale and turning the handle 64, the workman may set his gage with respect to the pattern 53 so as to grind lenses to any size. It will be noted that the graduated scale is conveniently located, where the operator has only to look down and he will see it clearly.

Attention is again directed to the fact that the elliptic grinding is due to the pattern 53 engaging against the gage, the entire carriage swinging or oscillating about its axis formed by the bushing 14 and sleeve 15 within the lower tubular portion 19, and in order to press the lenses against the stone, or the pattern against its gage, a helical spring 70 is coiled around the shaft 17 within the lower tubular portion 19 of the carriage 18 and attached at one end to the carriage, as at 71, and at its other end to the sleeve 15. It will be remembered that the sleeve 15 can be turned by the hand wheel 16, and the desired degree of torsion of spring 70 is thus obtained by rotating the hand wheel 16 forming a part of the sleeve 17. A spring-actuated pawl 72 pivoted on the bracket 13, as at 73, and engaging ratchet teeth 74 on the wheel 16 normally retains the spring 70 against unwinding, but may be manually operated to release said spring tension entirely. By so doing, the carriage is readily swung outward from the stone toward the operator in a convenient position to manipulate the lenses, and when loaded the hand wheel is again wound upon to create the desired pressure to hold the lenses to the stone and the pattern to its gage. This adjustability of pressure of the lenses against the stone is important in the production of lenses accurately ground, as it will be seen various numbers of lenses may be ground at a time requiring therefor correspondingly varying pressure.

It may be noted here that where the number of lenses inserted at a time for grinding varies widely, removable heads 45 of different lengths are preferably employed. A funnel or hopper 75 is preferably arranged beneath the lenses being ground, so as to collect the water and grinding dust, said funnel or hopper having a tubular discharge 76, which can lead to any convenient point. The main shaft 17 extends at one end beyond its bearing and gears, and adjustably receives a gear 77 which is adapted to be driven from the shaft 3 of the grinding stone. Such drive may be any suitable train of gearing, but in the drawings, and especially Figs. 2 and 4 thereof, a chain 78 from the shaft 3 of the grinding stone is shown adapted to transmit rotary motion to a sprocket wheel 79 mounted on the end next adjacent to the grinding stone of a counter shaft 80 transversely supported on the side piece 6 in bearings 81, 82. Upon the outer end of the said counter shaft 80 is a gear 83 adapted to mesh with another gear 84 rotatively supported between the arms of a U-shaped bracket 85 which is pivoted at its open end to swing or rotate on said counter-shaft 80. The rotation of the shaft and gear 83 thereon tends to swing or rotate the U-shaped bracket and its supported gear 84 in a clockwise direction, (as viewed in Fig. 2), resulting in its meshing with and operating another gear 86 which gear is mounted on a shaft 87 journaled transversely of the side piece 6 in suitable bearings 88, 88. This construction provides an efficient and inexpensive form of clutch, although numerous other forms of clutches might be substituted without departing from the spirit or scope of the invention. For throwing out said clutch means, I secure to side-piece 6 a guideway 89 in which is slidably mounted a bar or bolt 90 adapted to be shot across the path of a handle 91 on said U-shaped bracket 85 for the gear 84 and hold said gear out of engagement with gear 86 when it is not desired to have the lenses rotating. The bolt 90 may be readily retracted when it is desired to start the machine, at which time gear 84 again meshes with gear 86. The transmission of power is carried from gear 86 through a pair of beveled gears 92, 93 to a transmission shaft 94 mounted in bearings 95, 96 forming a part of side piece 6 near its front, it being understood that one of said beveled gears 92 is fast with respect to gear 86 and that the other of said beveled gears 93 is secured upon shaft 94 at one end thereof. Upon the other end of said transmission shaft 94 is secured another beveled gear 97 adapted to mesh with the beveled gear 77 on the projecting end of the main carriage shaft 17. It is to be here noted that this last-mentioned beveled gear 77 is adjustable longitudinally of shaft 17, whereby it may be brought to mesh properly when the carriage is shifted longitudinally upon the lower plate 7.

The lens supporting means and the driving connections above described are shown elevated above the frame 1 of the grinding machine, so that it will not interfere with the old forms of supporting means now upon grinding machines, but will lie above the same, such elevation being secured by the side pieces 5, 6. When so desired these side pieces 5, 6 may be surmounted by a second pair of side pieces 98 carrying a lens-supporting means 99 similar to the one above described and positioned immediately above the same, see Fig. 1. This second supporting means also has driving connections, similar to that described in connection with the first-mentioned lens supporting means and may be driven by a chain 100 from a sprocket 101 on the counter shaft 80 of the first or next lower lens supporting means, preferably next adjacent to the driving sprocket 79, whereby economy of space on the axle 3 of the stone is effected by necessitating only the one drive therefrom to operate the series of lens supporting means. It will be understood that still another or third lens supporting means might be added over the others, and indeed the number of supporting means in the series is limited only by the size of the grinding stone or demands of the user. Furthermore, I may mount upon the opposite end of the frame 1, adjacent to the grinding stone, one of my improved lens supporting means, as at 102, thereby utilizing the grinding surface of the stone at that end of the frame also. Then by building up side pieces 103, 104 from the frame 1 to carry other lens supporting means 105 and 106, a series of lens supporting means may be provided at this end of the grinding machine, their construction and operation being similar to that described in connection with those at the front end of the machine. Because of the compact arrangement of all the lens supporting means upon the one grinding machine or stone, it is easy for a single operator to tend them all, and much space as well as cost of installation is saved. While the operator is removing or arranging the lenses in one of the supporting means, the lenses in others of said supporting means may be grinding, it being thus made possible to grind an increased number of lenses at one time. Moreover, since each lens supporting means of my improved machine can be set or adjusted independent of the rest, a plurality of lots of lenses of different shapes or sizes can be ground at the same time. Also since there is a series of lens supporting means in one of my machines, different ones may be set to grind different standard sizes or shapes of lens, and thus the machine is always ready to grind any of those sizes or shapes without adjustment.

In order to prevent the lenses during the process of grinding from wearing grooves in the stone, I have provided means to reciprocate the stone longitudinally of its axis during rotation. One such means, shown more especially in Figs. 11 and 12, provides upon the axle 3 of the stone, a pair of worms 107 and 108 threaded right-and left-hand, respectively and arranged upon opposite sides of the stone. At the outer end of each worm is a collar adjustably fixed upon the axle of the grinding stone inside its bearing 2, and outside said bearing is another similar collar, the inside and outside collars for the right-hand threaded worm 107 being designated by reference numerals 109 and 110, respectively, and those for the left-hand-threaded worm 108 being marked 111 and 112, respectively. Pivoted upon the top of each of the bearings 2 is a lever or rocker arm extending longitudinally of the axle 3, and provided at its inner end or end next adjacent to the grinding stone with a finger adapted to enter between the threads of the worm beneath. Between said finger or inner end of the lever and its fulcrum is a depending swell or cam adapted to engage the inside collar, and on the end of the lever outside its fulcrum or the bearing 2 is a depending swell or cam adapted to engage the outside collar. A spur extends upward from the lever or rocker arm above its fulcrum, and a helical spring extending under tension from the end of said spur to a point vertically beneath on the bearing 2 or other fixed support, tends to draw down either end of the rocker arm when it is depressed below a horizontal line through the fulcrum. The lever or rocker arm for the right-hand threaded worm 107 is marked 113, its finger 114, its inside swell 115, its outside swell 116, its spur 117 and its spring 118, in the drawings, while the corresponding parts for the left-hand threaded worm 108 are marked with reference numerals 119 to 124, respectively.

In operation, the grinding-stone being at the right-hand end of its lateral movement, as shown in Fig. 11, and rotating as indicated by the arrow, the lever or rocker arm 119 for the left-handed worm 108 is raised into idle position by engagement of the inside collar 111 with the inside swell 121, while the lever or rocker arm 113 for the right-hand threaded worm 107 is lowered with its finger 114 in engagement with said worm, by virtue of the outside collar 110 pressing against the outside swell 116. Thus as the grind-stone turns it will be fed toward the left-hand side of the figure by its worm 107 engaging said finger 114, but as it approaches the limit of movement in that direction the inside collar 109 of the active worm 107 engages the inside swell 115 of the rocker arm 113 and disengages the same, while at the same time the outside collar 112 at the opposite side of the grind-stone engages the outside swell 122 of the rocker arm 119 and depresses the finger 120 thereof into engagement with the left-hand threaded worm 108 so that the motion of the grindstone is reversed.

In Figs. 13, 14 and 15 I have shown other means for imparting reciprocation to a grinding-stone 129 longitudinally of its axle 130, consisting of a worm keyed to one end of said axle outside the frame 131 in which said axle is mounted by bearings 132 in which it can slide. This worm 133 engages a worm-wheel 134 keyed to a shaft 135 which has bearings in the lower forked end of a yoke 136 whose upper forked end receives the axle 130, the worm 133 lying between the arms of said fork and the worm wheel 134 lying between the arms of the lower fork. Collars 137, 138 upon the axle 130 prevent movement of the yoke 136 longitudinally of said axle, and as shown in the drawing the worm-wheel 134 prevents longitudinal movement of the shaft 135, although if preferred other suitable and well-known means could be employed. The shaft 135 is provided adjacent to the parts described with a universal joint 139, and extends in the general direction of the length of the frame 131 or along the side of the grinding machine. This shaft 135 extends intermediate of its ends through a fulcrum sleeve 140 which is pivoted in a bracket 141 projecting from the frame 131, so as to swing in a horizontal plane and thus permit the portion of the shaft beyond its universal joint 139 to swing similarly. The end of the shaft 135 beyond its said fulcrum sleeve 140 is provided with a segmental gear 142, the teeth which extend about half-way around the circumference, the rest of the circumference being smooth, and this gear is arranged edgewise between two racks 143, 144 arranged at such a distance apart that when the teeth on the gear engage one rack the opposite smooth edge is contiguous to the teeth of the other rack, as shown in Fig. 15. Said racks 143, 144 are preferably carried by the frame 131 of the machine and project therefrom a suitable distance, being slightly curved in plan, as shown in Fig. 13, upon the vertical pivoting of the fulcrum sleeve 140 as a center.

In operation, the rotation of the grinding-stone as shown by the arrow turns the worm 133 and thus the worm wheel 134, shaft 135 and gear 142 always in the same direction, as shown by the arrows on said parts in the drawing. The segmental gear 142 being in engagement at its toothed portion with the lower rack, as shown in Fig. 15, will roll toward the left-hand side of said figure and thus swing the shaft 135 in horizontal plane upon its fulcrum intermediate the ends and slide the grinding-stone laterally toward the right-hand side of Fig. 13. When the teeth of the gear 142 disengage from the lower rack, they will begin to engage the upper rack, which will roll the gear in the reverse direction, or toward the right-hand as shown in the drawings, thus swinging the shaft 135 in the opposite direction and pushing the grind-stone laterally toward the left-hand side of its frame. In this manner a shifting of the grind-stone from side to side in alternate directions is continuously maintained. Preferably, the bracket 141 which supports the fulcrum sleeve 140 is adjustably mounted upon the frame 131, as by means of bolts 145 extending through slots 146 or in any other suitable manner, so that said fulcrum sleeve 140 can be adjusted longitudinally of the shaft 135 and thus the leverage changed to vary the lateral throw of the grinding stone to suit different widths of stones and so forth. I also prefer to have the bolts which secure the side pieces of any lens-supporting means to the frame 1, or to other side frames next below, extend through slots 147, as shown in Fig. 4, for example, so that the whole lens support can be moved toward or away from the grinding stone. Any other equivalent adjusting means which might occur to those skilled in the art could be employed equally well, however.

Obviously, my improvements can be applied to a grinding-stone entirely devoid of lens supporting means, such as used for hand grinding, just as well as to a machine already having a lens support, it being understood that in such cases I build up an entire series of lens supports at each end of the machine, as shown at the right-hand end of Fig. 1 herein. Various other applications and modifications may be made in carrying out my invention in practice, and I do not wish to be understood as limiting myself except as the state of the art may require.

Having thus described the invention, what I claim is—

1. In a machine of the character described, the combination with a grinding stone, of lens supporting means having parts adapted to rotate and present lenses to said grinding stone, a second lens supporting means mounted upon the first-mentioned lens supporting means and having parts adapted to rotate and present lenses to a different portion of the periphery of said grinding stone, driving connections between the rotatable parts of the first-mentioned lens supporting means and the grinding stone, and other driving connections between the rotatable parts of said second lens supporting means and said first-mentioned driving connections.

2. In a machine of the character described, the combination with a grinding stone, of lens supporting means having parts adapted to rotate and present lenses to said grinding stone, a second lens supporting means mounted upon the first-mentioned lens supporting means and having parts adapted to rotate and present lenses to a different portion of the periphery of said grinding stone, driving connections between the rotatable parts of the first-mentioned lens supporting means and the grinding stone, other driving connections between the rotatable parts of said second lens supporting means and said first-mentioned driving connections, and a clutch in one of said driving connections at a point farther away from the grinding stone than the union of the two driving connections.

3. In a machine of the character described, the combination with a substantially horizontal elongated frame and a grinding stone mounted therein, of a lens supporting means mounted transversely of said frame adjacent said grinding stone and having parts adapted to rotate and present lenses to the periphery thereof, a second lens supporting means above said first-mentioned lens supporting means also arranged transversely of the frame adjacent to the grinding stone and having parts adapted to rotate and present lenses to the periphery of said stone, and driving connections for transmitting motion to either of said rotatable parts of the lens supporting means while the other remains idle.

4. In a machine of the character described, the combination of a substantially horizontal frame, a grinding stone mounted therein with substantially one-half of it projecting above said frame, a plurality of lens supporting means extending upward from said frame adjacent the periphery of the grinding stone and having parts adapted each to rotate and present lenses to said grinding stone, and driving means for imparting motion to any one of said rotatable parts of the lens supporting means while the others remain idle.

5. In a machine of the character described, a lens supporting means comprising a base providing trunnions, a shaft extending through said trunnions, a carriage having a tubular portion pivotally receiving at its ends the said trunnions and inclosing the shaft between said trunnions, a lens carrier journaled in said carriage, and a helical spring in said tubular portion of the carriage for swinging the carrier.

6. In a machine of the character described, a lens supporting means comprising a base providing trunnions, a shaft extending through said trunnions, a carriage having a tubular portion pivotally receiving at its ends the said trunnions and inclosing the shaft between said trunnions, a lens carrier journaled in said carriage, a helical spring in said tubular portion of the carriage for swinging the carrier, and means for tightening and releasing said spring.

7. In a machine of the character described, a lens supporting means comprising a base, a swinging carriage mounted on said base, a lens carrier journaled in said carriage, a helical spring arranged longitudinally of the line of hinging of said carriage, and means for tightening and releasing said spring.

8. In a machine of the character described, a lens supporting means comprising a base with upwardly projecting bearings, a bushing in one bearing and a sleeve in the other projecting toward each other in alinement, a carriage with a tubular portion pivotally receiving at its ends the said bushing and sleeve, a lens carrier mounted on said carriage, a helical spring within said tubular portion of the carriage fastened at one end thereto and at its other end to said sleeve, and means for releasably holding said sleeve in different positions into which it may be turned.

9. In a machine of the character described, a lens supporting means comprising a base with upwardly projecting bearings, a bushing in one bearing and a sleeve in the other projecting toward each other in alinement, a carriage with a tubular portion pivotally receiving at its ends the said bushing and sleeve, a lens carrier mounted on said carriage, a helical spring within said tubular portion of the carriage fastened at one end thereto and at its other end to said sleeve, means for releasably holding said sleeve in different positions into which it may be turned, a shaft extending through said bushing, helical spring and sleeve, and means outside said sleeve for transmitting motion between said shaft and the lens carrier.

10. In a machine of the character described, the combination with a swinging carriage providing three alined bearings, of a lens carrier mounted in said bearings and comprising two members, one of said members being journaled in one of the end bearings and suitably held against longitudinal movement and the other member comprising bushings one in each of the other bearings and a spindle keyed in said bushings, a stop on said spindle between said bushings, a helical spring around said spindle between said stop and the outside bushing, and a lever fulcrumed on the middle bearing adapted to engage said stop to retract the spindle.

11. In a machine of the character described, the combination with a swinging carriage providing three alined bearings, of a lens carrier comprising two members one journaled in one of the end bearings and the other member comprising bushings one in each of the other two bearings and a spindle slidably keyed in said bushings, a stop on the spindle between its said bushings, a spring between said stop and one of the bearings carrying the spindle, and a lever on the other of said bearings having cam edges adapted to engage said stop.

12. In a machine of the character described, a swinging carriage having a tubular portion around its line of hinging, a hand wheel having a hub projecting into one end of said tubular portion, a helical spring in said tubular portion fastened at one end to the carriage and at the other end to said hub, and a pawl for said hand wheel.

13. In a machine of the character described, a base, a swinging carriage having a tubular portion in axial alinement therewith and having ratchet teeth, a helical spring in said tubular portion fastened at one end to the carriage and at the other end to said hand-wheel, and a pawl on the base for said ratchet teeth.

14. In a machine of the character described, a swinging carriage, a spring for swinging said carriage, means for gradually tightening said spring, and means for instantly releasing said spring from a state of tension to idle condition.

JOSEPH H. COSSMAN.

Witnesses:
RUSSELL M. EVERETT,
HOWARD P. KING.